C. WEBER.

TABLE-MAT.

No. 6,830. Reissued Dec. 28, 1875.

Witnesses:

Henry Gentner

Wm. C. Dey.

Inventor:

Charles Weber by his attorney

Thomas L. Stetson

UNITED STATES PATENT OFFICE.

CHARLES WEBER, OF WEST MERIDEN, CONNECTICUT, ASSIGNOR TO THE NEWARK TEA-TRAY COMPANY.

IMPROVEMENT IN TABLE-MATS.

Specification forming part of Letters Patent No. 55,402, dated June 5, 1866; reissue No. 6,830, dated December 28, 1875; application filed April 20, 1875.

*To all whom it may concern:*

Be it known that I, CHARLES WEBER, of West Meriden, in the county of New Haven and State of Connecticut, have invented certain new and useful Improvements in Heat-Shields for Table-Mats and analogous purposes; and that the following is a full, true, and exact description thereof, sufficient to enable any person skilled in the art to construct the improved articles.

The invention relates to shields or stands to be interposed between a heated object and the surface over which said object is to be placed, the design being to prevent injury by the heat from the object above.

I make the body of the stand or shield of pasteboard or other suitable non-conducting material, and provide such body with a metal frame, by which its edges are inclosed.

Figure 1:
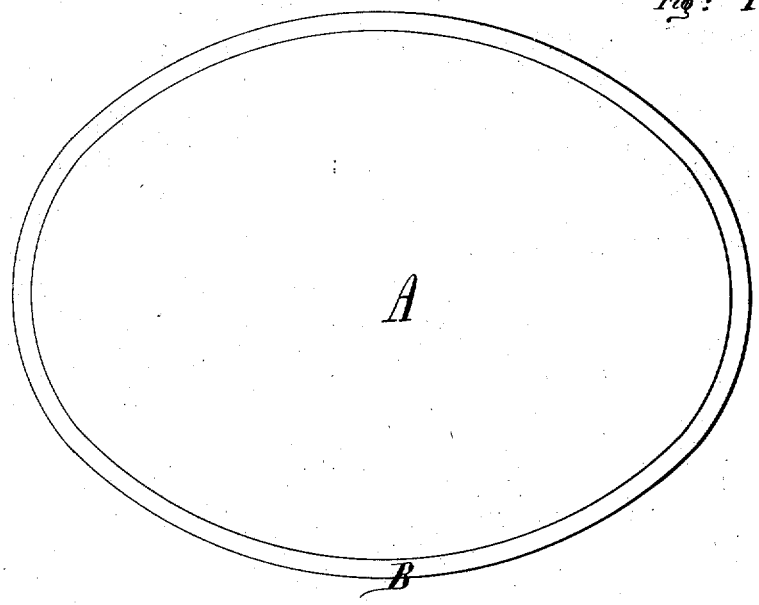
Figure 2:
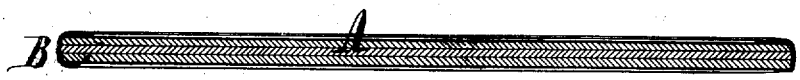

In the accompanying drawings, Figure 1 is a plan or top view of an improved heat-shield constructed in accordance with my invention; and Fig. 2 is a vertical section of the same.

Referring to the drawings, A represents the body of the shield, and B the metal frame, which embraces the edge of the shield, and extends smoothly inward on both faces of the body, so that the body is strengthened, and prevented from warping.

The stand may be made round or oval.

When pasteboard is used to form the body, it is prepared with oil and varnish, and backed, and then covered with cloth, leather, or other suitable material, and a structure is obtained which is cheap, and which is strong and durable, and capable of resisting heat and moisture.

The metal frame inclosing the edges of the shield may be used in combination with any other suitable material; but I use, by preference, pasteboard prepared as above described.

My body A is efficient to protect the surface upon which it is placed from injury from heated objects above, and at the same time the metallic frame B makes it durable and of elegant appearance.

I claim as my invention—

The heat-shield described, having the metal rim B, inclosing the edge of the round or oval body A, and extending smoothly inward on both faces, substantially as and for the purposes specified.

In testimony whereof I have hereunto set my hand this 13th day of March, 1875, in the presence of two subscribing witnesses.

CHARLES WEBER.

Witnesses:
W. HAUFF,
E. F. KASTENHUBER.